US011230007B2

(12) United States Patent
Haddadin et al.

(10) Patent No.: US 11,230,007 B2
(45) Date of Patent: Jan. 25, 2022

(54) ROBOT HAVING A CONTROLLER PROTECTED FOR A NETWORK FAILURE

(71) Applicant: Franka Emika GmbH, Munich (DE)

(72) Inventors: Sami Haddadin, Hannover (DE); Björn Pietsch, Munich (DE)

(73) Assignee: Franka Emika GmbH, Munich (DE)

( * ) Notice: Subject to any disclaimer, the term of this patent is extended or adjusted under 35 U.S.C. 154(b) by 499 days.

(21) Appl. No.: 16/094,392

(22) PCT Filed: Apr. 25, 2017

(86) PCT No.: PCT/EP2017/059693
§ 371 (c)(1),
(2) Date: Oct. 17, 2018

(87) PCT Pub. No.: WO2017/186655
PCT Pub. Date: Nov. 2, 2017

(65) Prior Publication Data
US 2019/0126481 A1 May 2, 2019

(30) Foreign Application Priority Data
Apr. 25, 2016 (DE) ............ 10 2016 005 366.6

(51) Int. Cl.
*B25J 9/16* (2006.01)
*B25J 19/00* (2006.01)
(Continued)

(52) U.S. Cl.
CPC ........... *B25J 9/1674* (2013.01); *B25J 13/006* (2013.01); *B25J 19/005* (2013.01); *B25J 19/06* (2013.01);
(Continued)

(58) Field of Classification Search
CPC ........ B25J 9/1674; B25J 19/06; B25J 19/005; B25J 19/0004; B25J 13/006;
(Continued)

(56) References Cited

U.S. PATENT DOCUMENTS 5,444,348 A 8/1995 Garrec
2001/0047224 A1 11/2001 Hietmann et al.
(Continued)

FOREIGN PATENT DOCUMENTS

CN 102256755 A 11/2011
CN 202121500 U 1/2012
(Continued)

OTHER PUBLICATIONS

Dietrich et al., "Extensions to Reactive Self-Collision Avoidance for Torque and Position Controlled Humanoids", May 9-13, 2011, 2011 IEEE International Conference on Robotics and Automation, 3455-3462 (Year: 2011).*
(Continued)

*Primary Examiner* — Khoi H Tran
*Assistant Examiner* — Tanner L Cullen
(74) *Attorney, Agent, or Firm* — Hoffmann & Baron, LLP

(57) ABSTRACT

A robot having actuator-driven elements, actuators to drive the elements, and brakes to decelerate the elements, the robot requiring voltage $U_B$ and/or current $I_B$, the robot including: a source having an input to which voltage $U_P$ and current $I_P$ are applied, wherein, during normal operation, $U_P$ is equal to voltage $U_{P,desired}$ and $I_P$ is equal to current $I_{P,desired}$, and having an output to which voltage $U_{actual}$ and current $I_{actual}$ are supplied, wherein during normal operation: $U_{actual}=U_B$ and $I_{actual}=I_B$, an energy store integrated into the source for maintaining $U_B$ and $I_B$ for time $\Delta t$ following failure or drop in $U_P$ and/or $I_P$, a unit for monitoring $U_P$, wherein as soon as $U_P$ deviates by amount $\Delta U$ (Continued)

from $U_{P,desired}$, a signal is generated, and a control unit connected to the unit for controlling the robot and its elements into a predefined safe state upon receipt of the signal.

5 Claims, 1 Drawing Sheet

(51) Int. Cl.
    *G05B 19/406* (2006.01)
    *B25J 19/06* (2006.01)
    *B25J 13/00* (2006.01)

(52) U.S. Cl.
    CPC .. *G05B 19/406* (2013.01); *G05B 2219/25362* (2013.01); *G05B 2219/34369* (2013.01); *G05B 2219/34474* (2013.01); *G05B 2219/50082* (2013.01)

(58) Field of Classification Search
    CPC .............. G05B 19/406; G05B 19/4067; G05B 2219/50082; G05B 2219/34474; G05B 2219/25362; G05B 2219/34369; H02P 3/04; H02P 3/22; H02P 3/12; H02P 6/24
    See application file for complete search history.

(56) References Cited

U.S. PATENT DOCUMENTS

| | | | |
|---|---|---|---|
| 2004/0028507 A1* | 2/2004 | Massaro | G01N 35/0099 414/4 |
| 2006/0102394 A1* | 5/2006 | Oliver | B60L 7/26 180/65.24 |
| 2011/0127935 A1* | 6/2011 | Gao | H02M 1/36 318/400.3 |
| 2011/0234141 A1* | 9/2011 | Kataoka | G05B 19/406 318/563 |
| 2012/0059516 A1 | 3/2012 | Lundberg et al. | |
| 2012/0116581 A1 | 5/2012 | Kwon et al. | |
| 2013/0310974 A1 | 11/2013 | Iwata | |
| 2014/0229013 A1* | 8/2014 | Yamamoto | G05B 19/29 700/275 |
| 2014/0292231 A1 | 10/2014 | Kanada | |
| 2015/0306766 A1* | 10/2015 | Jonsson | B25J 9/1656 700/245 |

FOREIGN PATENT DOCUMENTS

| | | |
|---|---|---|
| CN | 104407614 A | 3/2015 |
| DE | 3629367 A1 | 3/1988 |
| DE | 69205429 T2 | 10/1995 |
| DE | 10032096 A1 | 1/2002 |
| DE | 102008021671 A1 | 11/2009 |
| EP | 2379286 A1 | 10/2011 |
| EP | 2379286 B1 | 10/2011 |
| JP | 9-11181 A | 1/1997 |
| JP | 10-271866 A | 9/1998 |
| JP | 2002218676 A | 8/2002 |
| JP | 2003-25271 A | 1/2003 |
| JP | 2005-533669 A | 11/2005 |
| KR | 10-2011-0140017 A | 12/2011 |
| KR | 10-2012-0047691 A | 5/2012 |
| WO | WO 2004/009300 A1 | 1/2004 |
| WO | WO 2012/105194 A1 | 8/2012 |

OTHER PUBLICATIONS

English translation of the International Preliminary Report on Patentability dated Nov. 8, 2018 for International Application No. PCT/EP2017/059693.

English-language translation of Decision of Dismissal of Amendment issued in Japanese Application No. 2018-555625 dated Mar. 30, 2021.

English-language translation of Summary of Text of First Office Action issued in Chinese Application No. 201780024635.7 dated Jan. 8, 2021.

English-language summary of Office Action issued in Chinese Patent Application No. 2017800246357 dated Aug. 10, 2021.

Jinnuo, Wang, et al., "Crane Design Manual", 2nd Edition, vol. II, China Railway Publishing House, Beijing, 2013.

* cited by examiner

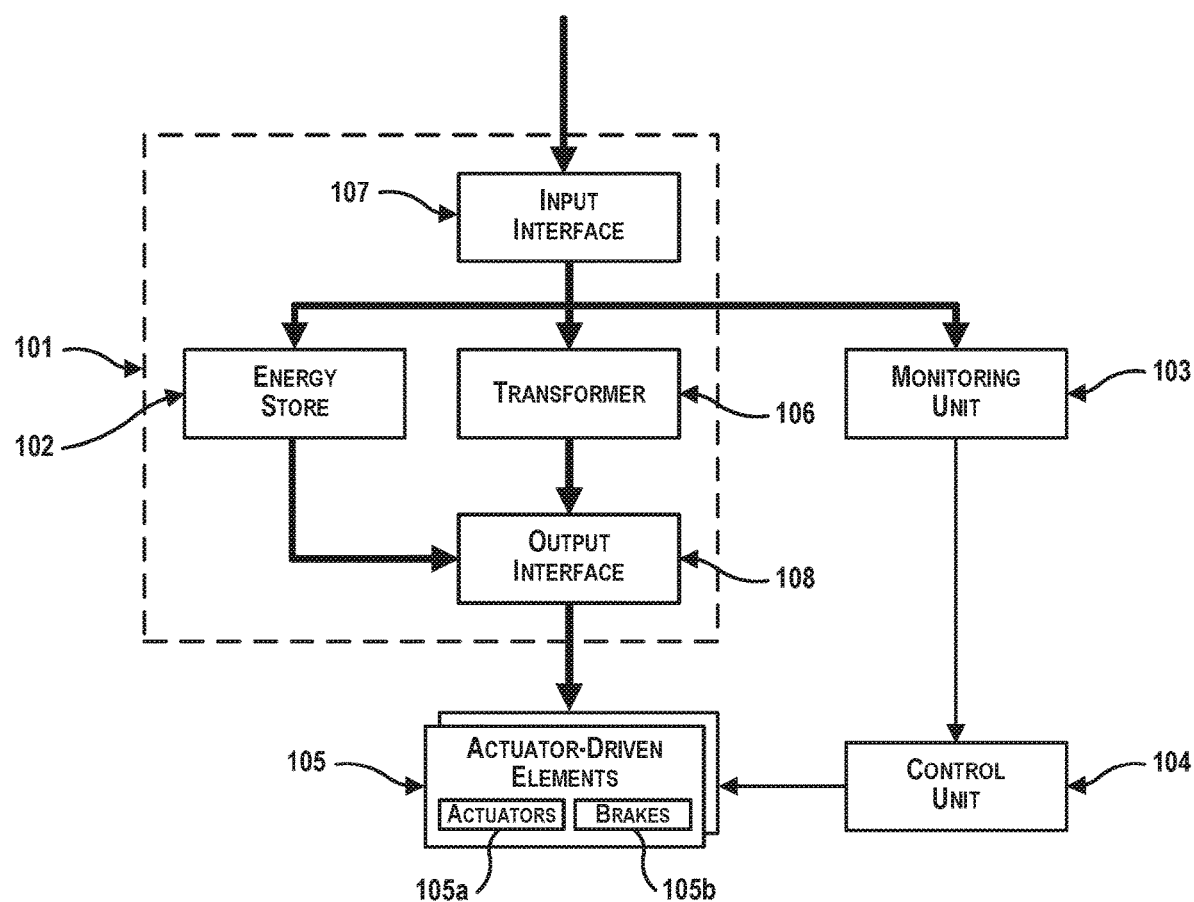

ROBOT HAVING A CONTROLLER PROTECTED FOR A NETWORK FAILURE

CROSS-REFERENCE TO RELATED APPLICATIONS

This application is the U.S. National Phase of International Patent Application No. PCT/EP2017/059693, filed on 25 Apr. 2017, which claims benefit of German Patent Application No. 102016005366.6, filed on 25 Apr. 2016, the contents of which are incorporated herein by reference in their entirety.

BACKGROUND

Field

The invention relates to a robot having a controller which is protected against a power network failure (failure of the electrical energy required to operate the robot). For this purpose, the robot has advantageously movable, actuator-driven elements.

Related Art

Robots typically require electric power to operate. This power is supplied, particularly in the case of immobile robots, via an electric power supply unit of the robot, which is connected on the input side to an electric power source, typically to an electric power network. The electric power network or the electric power source may suffer failure for a number of reasons. When such a failure occurs, for functional safety reasons it must be ensured that the robot, i.e., its movable elements in particular, will enter a safe state. Such a state is meant to ensure that the 25 robot will not become damaged, will not cause any damage in the area surrounding it, and will be operable immediately once the electric power supply is restored, if at all possible without any problems and without requiring intervention.

SUMMARY

The object of the invention is therefore to provide a robot that will enter a safe state, in particular with its moving elements, when a failure of the power supply occurs, and which will simply be ready to operate again once the network power supply is restored.

The invention will be clear from the features of the independent claims. Advantageous refinements and embodiments are the subject matter of the dependent claims. Other features, applications and advantages of the invention will be apparent from the following description, and from the elucidation of exemplary embodiments of the invention, which are depicted in the FIGURE.

The object is attained by a robot having actuator-driven elements, actuators to drive the actuator-driven elements, and mechanical brakes to decelerate the actuator-driven elements, the robot requiring a desired operating voltage $U_B$ and/or a desired operating current $I_B$ in order to operate. The robot includes a voltage and current source (i.e., a power supply unit) having an input interface, to which a primary voltage $U_P$ and a primary current $I_P$ are applied, wherein during normal operation the primary voltage $U_P$ is equal (in terms of control and noise tolerances) to a desired primary voltage $U_{P,desired}$ and the primary current $I_P$ is equal (in terms of control and noise tolerances) to a desired primary current $I_{P,desired}$, and also having an output interface, to which an actual voltage $U_{actual}$ and an actual current $I_{actual}$ are applied, wherein during normal operation (in terms of control and noise tolerances). $U_{actual}=U_B$ and $I_{actual}=I_B$, an energy store which is integrated into the voltage and current source and which, following a failure or a drop in the primary voltage/primary current, maintains the operating voltage $U_B$ and the operating current $I_B$ for a predefined period of time $\Delta t$, a monitoring unit for monitoring the primary voltage $U_P$ applied to the input interface, the monitoring unit being configured such that, as soon as the applied primary voltage $U_P$ deviates from the desired primary voltage $U_{P,desired}$ by a predefined amount $\Delta U$, a stop signal is generated, and a control unit which is connected to the monitoring unit and which is designed for controlling the robot and the actuator-driven elements thereof, the control unit being configured to control the robot and the elements thereof into a predefined safe state upon receipt of the stop signal, wherein control of the robot into the predefined safe state includes driving the actuators of the actuator-driven elements such that the robot decelerates into a dynamic state characterized by a sum of kinetic energy of at least a plurality of the actuator-driven elements, wherein the sum is less than a predefined boundary kinetic energy, and triggering one or more of the mechanical brakes to further decelerate the actuator-driven elements only when the robot has been decelerated by the actuators into the dynamic state.

The term "actuator-driven elements" is interpreted broadly in the present case. It includes essentially all movable, actuator-driven elements of the robot, for example, members of a robot manipulator, artificial limbs, drive wheels, etcetera.

The voltage and current source is preferably embodied as a power supply unit of the robot, with the robot being operated at a desired operating voltage $U_B$ and/or a desired operating current $I_B$, which is supplied to the output interface of the voltage and current source. The input interface of the voltage and current source is advantageously connected to an electric power network, typically a low voltage network (for example, a 230V-240V power network or a 400V-420V three-phase alternating current network). The voltage and current source advantageously converts the primary voltage $U_P$ which is applied to the input side to the actual voltage $U_{actual}$ which is supplied to the output interface. Typically, $U_{actual}<U_P$.

During normal robot operation, the actual voltage $U_{actual}$ supplied to the output interface is equal to the desired operating voltage $U_B(U_{actual}=U_B)$. In addition, during normal robot operation, the actual current $I_{actual}$ supplied to the output interface is equal to the desired operating current $I_B(I_{actual}=I_B)$.

According to the invention, the voltage and current source is further equipped with an energy store, which is integrated into the voltage and current source and which is designed and configured such that, following a failure or a drop in the primary voltage $U_P$ or the primary current $I_P$ at the input interface, the operating voltage $U_B$ and the operating current $I_B$ at the output interface are maintained for a predefined period of time $\Delta t$. The energy store is preferably equipped with one or more capacitors and/or one or more inductors and/or one or more accumulators for energy storage. The term "inductors" in the present case includes, for example, inductors, coils, transformers, etcetera. The dimensions of the energy store are advantageously dependent upon the amount of energy required by the robot to bring the robot from any dynamic state (any possible dynamic state of the operator) into a safe state.

The term "safe state" is interpreted broadly in the present case. It includes essentially any state of the robot that can be detected by means of sensors. In particular, the term includes a predefined state of the movable elements of the robot, in particular a deceleration of all the movable elements of the robot into a predefined pose or a deceleration of all the movable elements of the robot into said state without a predefined pose. The "safe state" may further include, for example, electrical states and data-related states of the robot. For instance, the safe state may include a data backup, etcetera.

Advantageously, once the stop signal has been received, the control unit quasi instantaneously initiates the establishment of the safe state, in particular initiating a deceleration process of the actuator-driven movable elements of the robot into a mechanical safe state. The safe state is advantageously predefined appropriately depending upon the task set for the robot, and advantageously meets the condition that, during the establishment of the safe state, in particular by decelerating the movable elements of the robot into the safe mechanical state, the robot does not present a threat to its environment or to itself.

The dimensions of the energy store are advantageously selected such that in the event of a total failure of the primary voltage $U_P$/primary current $I_P$ applied to the input interface it is ensured that the operating voltage $U_B$ and the operating current $I_B$ at the output interface are maintained for the predefined period of time $\Delta t$. The period of time $\Delta t$ is advantageously a required period of time during which the robot can be brought from any state into a safe state.

Appropriate dimensions of the energy store thus ensure that, even with a total failure of the voltage or current supply to the input side of the voltage and current source, it is always ensured that the robot can be transferred from any state into a safe state. The state referred to as "any" state is any element of the set of all the states that the robot is able to occupy.

One advantageous refinement of the proposed robot is characterized in that actuators of the actuator-driven elements are designed for the recuperation of electric power and can be connected to the integrated energy store. Thus, it is advantageously possible to convert kinetic energy of the movable elements of the robot during the deceleration process into electrical energy and to use this energy to increase the energy stored in the energy store.

One advantageous refinement of the proposed robot is characterized in that the control unit is designed such that the controlling of the robot into the predefined safe state includes a triggering of the mechanical deceleration of the actuator-driven elements. Advantageously, the mechanical brake(s) of the actuator-driven elements is/are triggered only when the robot has been decelerated by actuators into a dynamic state which is preferably characterized by the sum of the kinetic energy of some or all of the movable elements of the robot, which is less than one predefined boundary kinetic energy. It can thereby be ensured that an abrupt intervention by mechanical brakes takes place only when no mechanical or other damage to the robot will be caused by engagement of the mechanical brakes. Prior to this point, the robot. i.e., its actuator-driven movable elements, is preferably decelerated by the actuators. This refinement increases the availability of the robot system, since a firm response by mechanical brakes with the associated risk of mechanical damage is generally avoided.

According to one advantageous refinement of the proposed robot, the stop signal is transmitted as an encrypted data signal via the symmetrically configured data link from the monitoring unit to the control unit. Further advantageously, the stop signal is an optical signal and the data link is configured for transmitting optical signals.

In principle, any wired or fiber optic transmission method is suitable for this transmission: analog voltage, digital signal (direct or modulated), communication protocol. The latter two groups are optically transmittable; this is advantageous because isolation is simultaneously achieved as a result (i.e., detection at the input interface with high voltage, processing at the output interface typically with lower voltage).

The stop signal is advantageously a high priority signal to the control unit of the robot indicating that a power failure at the output interface is imminent.

Advantageously, when a drop in voltage occurs at the output interface, mechanical brakes are engaged immediately so that the movable elements of the robot are decelerated almost instantaneously. Thus, a safe initiation of a deceleration process is always ensured. In this case, a reliable implementation of the energy storage function is not necessary, because the mechanical deceleration process is initiated independently of the energy that is available in the energy store.

Further advantages, features and details will be apparent from the following description, in which at least one exemplary embodiment is described in detail, with reference to the drawings where appropriate. The same, similar and/or functionally equivalent parts are provided with the same reference signs.

BRIEF DESCRIPTION OF THE DRAWINGS

In the drawings:
FIG. 1 shows a schematic diagram of one embodiment of the proposed robot.

DETAILED DESCRIPTION

FIG. 1 shows a schematic diagram of one embodiment of the proposed robot having actuator-driven elements 105, actuators 105a to drive the actuator-driven elements 105, and mechanical brakes 105b to decelerate the actuator-driven elements 105, wherein the robot requires a desired operating voltage $U_B$ and/or a desired operating current $I_B$ for operation. The robot includes a voltage and current source 101 having an input interface 107 to which a primary voltage $U_P$ and a primary current $I_P$ are applied, wherein during normal operation, the primary voltage $U_P$ is equal to a desired primary voltage $U_{P,desired}$ and the primary current $I_P$ is equal to a desired primary current $I_{P,desired}$, and also having an output interface 108 to which an actual voltage $U_{actual}$ and an actual current $I_{actual}$ are applied, wherein during normal operation: $U_{actual}=U_B$ and $I_{actual}=I_B$.

Voltage and current source 101 includes an energy store 102 integrated therein, in the present case including a plurality of capacitors which, following a failure or a drop in the primary voltage $U_P$ and/or primary current $I_P$, maintain the operating voltage $U_B$ and the operating current $I_B$ at the output interface 108 for a predefined period of time $\Delta t$.

Voltage and current source 101 further includes a transformer 106, which transforms the primary voltage $U_P$ supplied to the input interface 107 into a low-voltage range and supplies it to output interface 108 as the actual voltage $U_{actual}$.

The robot further includes a monitoring unit 103 for monitoring the primary voltage $U_P$ applied to input interface 107, with the monitoring unit 103 being designed in such a way that as soon as the applied primary voltage $U_P$ deviates from the desired primary voltage $U_{P,desired}$ by a predetermined amount $\Delta U$, a stop signal is generated.

Finally, the robot includes a control unit 104, which is connected to monitoring unit 103 and is designed for controlling the robot and its actuator-driven elements 105, with the control unit 104 being configured to control the robot with its actuator-driven elements 105 into a predefined safe state upon receipt of the stop signal. Control of the robot into the predefined safe state includes driving the actuators 105a of the actuator-driven elements 105 such that the robot decelerates into a dynamic state characterized by a sum of kinetic energy of at least a plurality of the actuator-driven elements 105, wherein the sum is less than a predefined boundary kinetic energy, and triggering one or more of the mechanical brakes 105b to further decelerate the actuator-driven elements 105 only when the robot has been decelerated by the actuators 105a into the dynamic state.

In FIG. 1, the load current paths are indicated by bold arrows. The thinner arrows proceeding from monitoring unit 103 to control unit 104 and from there to the actuator-driven elements 105 of the robot are data lines. Advantageously, the stop signal is an optical signal and the data lines are configured as optical fibers.

Although the invention has been further illustrated and described in detail by way of preferred example embodiments, the invention is not restricted by the disclosed examples, and other variations may be derived from the examples by those skilled in the art, without departing from the scope of the invention. It is therefore clear that a multitude of possible variations exists. It is also clear that cited, exemplified embodiments are actually merely examples, and are not to be construed in any way as limiting the scope, applicability, or configuration of the invention. Rather, the foregoing description and the description of the figures enable a person skilled in the art to implement the example embodiments, and those skilled in the art with knowledge of the disclosed inventive concept may make various modifications, for example as to the function or the arrangement of individual elements cited in an example embodiment, without departing from the scope as defined by the claims and their legal equivalents, such as the detailed explanations in the description.

LIST OF REFERENCE SIGNS 101 voltage and current source/power supply unit
102 energy store integrated into the voltage and current source
103 monitoring unit
104 control unit
105 actuator-driven elements of the robot
106 transformer
107 input interface
108 output interface

The invention claimed is:

1. A robot comprising actuator-driven elements, actuators to drive the actuator-driven elements, and mechanical brakes to decelerate the actuator-driven elements, the robot requiring a desired operating voltage $U_B$ and/or a desired operating current $I_B$ in order to operate, wherein the robot comprises:
   a voltage and current source comprising:
      an input interface to which a primary voltage $U_P$ and a primary current $I_P$ are applied, wherein, during normal operation, the primary voltage $U_P$ is equal to a desired primary voltage $U_{P,desired}$ and the primary current $I_P$ is equal to a desired primary current $I_{P,desired}$; and
      an output interface to which an actual voltage $U_{actual}$ and an actual current $I_{actual}$ arm supplied, wherein during normal operation: $U_{actual}=U_B$ and $I_{actual}=I_B$;
   an energy store integrated into the voltage and current source and configured to maintain the operating voltage $U_B$ and the operating current $I_B$ for a predefined period of time $\Delta t$ following a failure or a drop in the primary voltage $U_P$ and/or primary current $I_P$;
   a monitoring unit configured to monitor the primary voltage $U_P$ applied to the input interface and configured to generate a stop signal as soon as the applied primary voltage $U_P$ deviates by a predefined amount $\Delta U$ from the desired primary voltage $U_{P,desired}$; and
   a control unit connected to the monitoring unit and configured to control the robot and its actuator-driven elements, wherein the control unit is further configured to control the robot with its actuator-driven elements into a predefined safe state upon receipt of the stop signal, wherein control of the robot into the predefined safe state comprises driving the actuators of the actuator-driven elements such that the robot decelerates into a dynamic state characterized by a sum of kinetic energy of at least a plurality of the actuator-driven elements, wherein the sum is less than a predefined boundary kinetic energy, and triggering one or more of the mechanical brakes to further decelerate the actuator-driven elements into the predefined safe state only when the robot has been decelerated by the actuators into the dynamic state.

2. The robot according to claim 1, wherein the actuators of the actuator-driven elements are connectable to the integrated energy store to recuperate electrical energy.

3. The robot according to claim 1, wherein the energy store comprises one or more capacitors, and/or one or more inductors, and/or one or more accumulators.

4. The robot according to claim 1, wherein the stop signal is transmitted as a symmetrical and encrypted data signal from the monitoring unit to the control unit via a data link configured to transmit symmetrical and encrypted data signals.

5. The robot according to claim 1, wherein the stop signal is transmitted as an optical signal from the monitoring unit to the control unit via an optical data link configured to transmit optical signals.

* * * * *